(12) United States Patent
Small

(10) Patent No.: US 7,101,524 B2
(45) Date of Patent: Sep. 5, 2006

(54) PROCESS FOR PURIFYING SAND

(75) Inventor: Terrence P. Small, Glen Mills, PA (US)

(73) Assignee: GE Betz, Inc., Trevose, PA (US)

( * ) Notice: Subject to any disclaimer, the term of this patent is extended or adjusted under 35 U.S.C. 154(b) by 707 days.

(21) Appl. No.: 10/223,196

(22) Filed: Aug. 19, 2002

(65) Prior Publication Data

US 2003/0108463 A1    Jun. 12, 2003

(51) Int. Cl.
C01B 33/00    (2006.01)
(52) U.S. Cl. .................................. 423/340; 423/150.1
(58) Field of Classification Search ................ 423/340, 423/150.1, 150.3
See application file for complete search history.

(56) References Cited

U.S. PATENT DOCUMENTS 4,405,588 A * 9/1983 Caballero et al. ........... 423/340

FOREIGN PATENT DOCUMENTS

BE    657065    *    4/1965

OTHER PUBLICATIONS

Translation of Belgium 657065, Apr. 1965.*
Peters, "Chelant extraction of heavy metals . . . " J. of Haz. Mat., 1999, no month, vol. 66, No. 1-2, pp. 151-210.*
Lam, et al., "Effect of chelation agent . . . ", Proceedings Soil and Crop Sci. Soc. of Florida, 1976, no month, vol. 35, pp. 96-98.*

* cited by examiner

Primary Examiner—Steven Bos
(74) Attorney, Agent, or Firm—Wegman, Hessler & Vanderburg

(57) ABSTRACT

A process for removing iron impurities from sand by treatment of an aqueous slurry of the sand with a chelating agent for iron cations.

19 Claims, No Drawings

PROCESS FOR PURIFYING SAND

FIELD OF THE INVENTION

This invention relates to a process for purifying sand, in particular to a process for eliminating iron impurities from sand.

BACKGROUND OF THE INVENTION

Over 15 million tons of sand per year is mined from areas that contain various iron species. Sand mined for glass and semiconductor production must be freed from various impurities, especially iron. Glass and semiconductor manufacturers have strict iron specifications that most sand mines cannot meet without using iron removal procedures. Iron species such as limonite and hematite are a few examples of the impurities typically found in sand bogs. Both are species of $Fe_2O_3$. The iron compounds that normally stain sand particles or form conglomerates are one of the most difficult impurities to remove using conventional processes. At present, the mineral process industry typically utilizes attrition scrubbers to separate iron and sand under caustic conditions. The process consists of three pH adjustments where the influent pH is typically low (3–5) and must by adjusted to pH of 10 or greater. Then the scrubber effluent must be acidified to pH 2–3 to separate the tails and iron. After the separation, the water is neutralized to pH 7. However, this process often does not remove enough iron to increase the utility of the sand in glass and semiconductor production.

U.S. Pat. No. 4,405,588 discloses a method of removing iron impurities adhering to silica sand particles, comprising grinding the ore, washing and desliming the ground ore to remove the major part of the clay-type binder, attrition scrubbing the deslimed particles to release further amounts of binder, washing and desliming to remove the binder, drying and heating the ore particles, treating the hot particles with a chemical agent suitable for converting the iron impurities into water soluble iron compounds, attrition scrubbing the hot suspension of chemically treated particles to release the iron stains, and washing with cold water and desliming to recover the purified particles. The chemical agents disclosed are sulfuric acid, hydrochloric acid and caustic soda.

U.S. Pat. No. 5,334,364 discloses a process for purifying silica sand consisting of subjecting the sand to centrifugal rotation under dry conditions while simultaneously agitating the particles, and then eliminating the impurities from the sand particle mixture.

SUMMARY OF THE INVENTION

This invention is a method for removing iron species present on the surface of sand comprising adding to an aqueous slurry of the sand a chelating agent for iron cations for a time sufficient for the chelating agent to convert at least a portion of the iron species into water-soluble iron compounds.

DETAILED DESCRIPTION OF THE INVENTION

This invention encompasses a new approach to removing the iron stains and iron particulates from the bulk of sand particles. This new approach increases the utility of the sand and eliminates inefficient processes such as the sodium hydroxide and sulfuric acid treatments of the currently used process. Instead, the process of the invention is carried out under the acidic influent conditions typically found in commercial practice. Moreover, the process of the invention increases the level of iron separation. The treatment can be applied to the raw sand as a soak, to the feedstock upstream from the scrubber, or to the product in another unit operation. Because of the low iron contents achieved, sand processed by this approach could be used in the glass and microelectronic manufacturing.

The chelating agents for use in the invention are preferably selected from the group consisting of polycarboxylic acids, organophosphonic acids and urea hydrochloride.

Exemplary polycarboxylic acids are ethylenediamine tetraacetic acid, citric acid and ethylenediamine disuccinic acid. A preferred polycarboxylic acid is citric acid.

Exemplary organophosphonic acids are hydroxyethylidene diphosphonic acid, triaminomethyl phosphonic acid, aminotri(methylene phosphonic acid), hexamethylenediaminetetra phosphonic acid, 2-phosphonobutane tricarboxylic acid,1,2,4,-ethylenediamine tetra(methylene phosphonic acid), diethylenetriamine penta(methylene phosphonic acid), triethylenetetramine hexa(methylene phosphonic acid), aminopropylidene diphosphonic acid, hydroxypropylidene diphosphonic acid, hydroxybutylidene diphosphonic acid, hydroxyhexylidene diphosphonic acid, phosphonohydroxy acetic acid, polyisopropenyl phosphonic acid, nitrilo (trismethylene)(trishydroxyethylidene) diphosphonic acid and diethylenetriamine pentamethylene phosphonic acid. Hydroxyethylidene diphosphonic acid is particularly preferred.

It has been found that in some cases removal of iron stains and particulates from the sand with the chelating agents of the invention may be promoted by the presence of reducing agents for the iron species. Exemplary reducing agents are sodium sulfite, isoascorbic acid, alkali metal salts of isoascorbic acid, ascorbic acid, alkali metal salts of ascorbic acid, diethylhydroxylamine, glucose and hydrazine. Preferred reducing agents are sodium sulfite, isoascorbic acid and alkali metal salts of isoascorbic acid.

In carrying out the process of the invention, sand which has been deslimed and freed from clay impurities is agitated with an aqueous solution of chelating agent, or chelating agent plus reducing agent, for a period of time sufficient to convert the insoluble iron compounds on the sand into soluble iron compounds. The time required for complete removal will depend on the particular nature of the sand, the level of iron impurities and the concentration of the chelating agent utilized. The time required will generally be from about 5 to about 45 minutes, preferably from 10 to 30 minutes to fully convert the insoluble iron compounds. However, processes where the sand is soaked with reagent with little or no agitation may require several days to reduce the iron content when used as a raw sand treatment.

The amount of chelating agent utilized will also depend on variables in the sand and operating system, particularly the on the amount of iron stain to be removed. Preferably the chelating agents will be used at levels of from about 10 to about 100,000 parts per million (ppm) on an actives basis based on the weight of the sand. More preferably the levels will be from about 10 to about 50,000 ppm, and most preferably from about 10 to about 1,000 ppm. When reducing agent is used in conjunction with chelating agent, it will preferably be used at levels from about 5% to about 500%, more preferably from about 10% to about 100%, and most preferably from about 10% to about 25% of the amount of chelating agent.

Following the iron removal step, the sand may be freed of the soluble iron compounds and the treatment chemicals by washing with water.

The invention is illustrated by the following examples, which are exemplary only and not intended to be limiting. All percentages, parts, etc. are by weight unless otherwise indicated.

Procedures

In Examples 1–6 and Comparative Example 1, sand and water (70% by weight sand) were stirred at 295 rpm in 3 l containers. A 30 ml sample of the suspension water was obtained from each container for baseline iron analysis. The appropriate treatment was then added at the level indicated in Table 1, and the resulting suspensions were stirred at room temperature for about 10 minutes. At this point, additional 30 ml samples of the suspension water were obtained for analysis. These samples contain the free and deposited iron removed from the sand.

The residues in the water samples were digested with 10% hydrochloric acid for 24 hours at 80° C. to liberate the iron for analysis. Inductive Coupling Plasma MS was used to determine the total iron concentration. The results are reported in Table 1 in the columns labeled "Total Iron (Initial), ppm" and "Total Iron (Final), ppm". In the Table, "% Iron Increase" is calculated by subtracting "Total Iron (Initial), ppm" from "Total Iron (Final)".

The "Effectiveness Ratio" is the ratio of the "% Iron Increase" for the Example to the "% Iron Increase" for the control.

The data in Table 1 demonstrate that the process of the invention reduces iron levels at least as effectively as the currently used caustic process, with the advantage that the process of the invention does not require multiple pH adjustments.

technique. In Examples 12–15 and the control example (Table 3), treatments were carried out on sand which had already been treated by the "conventional" caustic/acid process in order to demonstrate the ability to remove additional amounts of iron utilizing the process of the invention.

For Examples 7–15 as well as the control and comparative examples, iron analysis was carried out directly on the sand after washing and crushing using atomic absorption analysis. These samples were obtained from a typical sand mine and processor.

Feed and product grade samples were collected directly from the sand processing facility. The five-gallon samples of sand were dried and sieved to ensure homogeneity. Test samples were prepared by combining 1400 grams of sand and 400 grams of plant water. The test samples were poured into a stainless steel vessel and secured on a high torque, medium speed mixer. Components were combined and then diluted to 200 grams with plant water. After the agitator was activated, the treatment solutions were added to the test vessel and processed for 20 minutes at 300 rpm. Processed test samples were rinsed three times with plant water following the purifying process to remove soluble iron species formed during the process. The treated sand samples were then dried in an oven for 24 hours at 232° C. The dried sand samples were pulverized with mortar and pestle and analyzed by atomic absorption. Results for each test are displayed in Table 2 & 3.

Tables 2 and 3 report the iron level calculated as $Fe_2O_3$ and the % increase in the amount of $Fe_2O_3$ removed, calculated by subtracting the $Fe_2O_3$ level for the example from the $Fe_2O_3$ level for the control, and dividing the answer by the $Fe_2O_3$ for the control.

TABLE 1

| | Treatment | Treatment Level, ppm | Total Iron (Initial), ppm | Total Iron (Final), ppm | % Iron Increase | Effectiveness Ratio |
|---|---|---|---|---|---|---|
| Control | No Treatment (control) | | 21 | 25 | 4 | 1 |
| Comp. Example 1 | Sodium Hydroxide/Sulfuric Acid | 275/210 | 15 | 66 | 51 | 12.8 |
| Example 1 | Citric Acid | 100 | 13 | 84 | 71 | 17.8 |
| Example 2 | Nitrilo(trismethylene) (trishydroxyethylidene)/ Sodium Sulfite | 10/1 | 18 | 82 | 64 | 16 |
| Example 3 | Ethylenediamine Tetraacetic Acid | 100 | 21 | 91 | 70 | 17.5 |
| Example 4 | Ethylenediamine Disuccinic Acid | 100 | 15 | 73 | 58 | 14.5 |
| Example 5 | Hydroxyethylidene Diphosphonic Acid | 100 | 5.6 | 56 | 50 | 12.5 |
| Example 6 | Citric Acid/Isoascorbic Acid | 60/10 | 4.2 | 27 | 23 | 5.8 |

In Examples 7–11 and Comparative Example 2 (Table 2), the treatments were carried out on feed Grade sand, i.e. sand that had not been subjected to any other iron removing The data in tables 2 and 3 demonstrate clearly the improved iron removal achievable with the process of this invention.

TABLE 2

Iron Removal Results From Feed Grade Sand

| Treatment | Treatment | Treatment Level (ppm) | $Fe_2O_3$ (%) | % Increase in Iron Oxide Removed |
|---|---|---|---|---|
| Comp. Exp. 2 | (Caustic) |  | 0.055 | 0.0 |
| Example 7 | Ethylenediamine Tetraacetic Acid | 1,000/100 | 0.050 | 9.1 |
| Example 8 | Citric Acid | 1,000/100 | 0.046 | 16.4 |
| Example 9 | Citric Acid/ Isoascorbic acid | 1,000/100 | 0.044 | 20.0 |
| Example 10 | Urea Hydrochloride/ Sodium Sulfite | 10,000/2,000 | 0.042 | 23.6 |
| Example 11 | Hydroxy-ethylidene Diphosphonic Acid/Sodium Sulfite | 1,000/100 | 0.040 | 27.3 |

TABLE 3

Iron Removal Results From Product Grade Sand

| Treatment | Treatment | Treatment Level (ppm) | $Fe_2O_3$ (%) | % Increase in Iron Oxide Removed |
|---|---|---|---|---|
| Control | None |  | 0.051 | 0.0 |
| Example 12 | Hydroxy-ethylidene Diphosphonic Acid | 30,000 | 0.042 | 17.6 |
| Example 13 | Hydroxy-ethylidene Diphosphonic Acid/Sodium Sulfite | 5,000/25,000 | 0.042 | 17.6 |
| Example 14 | Hydroxy-ethylidene Diphosphonic Acid/Sodium Sulfite | 50,000/2,000 | 0.035 | 31.4 |
| Example 15 | Hydroxy-ethylidene Diphosphonic Acid/Sodium Sulfite | 10,000/37,500 | 0.030 | 41.2 |

What is claimed is:

1. A method for removing iron impurities from sand comprising adding to an aqueous slurry of the sand a chelating agent for iron cations for a time sufficient for the chelating agent to convert at least a portion of the iron impurities into water-soluble iron compounds, wherein the chelating agent comprises at least one organophosphonic acid.

2. The method of claim 1 wherein the chelating agent comprises at least one organophosphonic acid selected from the group consisting of hydroxyethylidene diphosphonic acid, triaminomethyl phosphonic acid, aminotri(methylene phosphonic acid), hexamethylenediaminetetra phosphonic acid, 2-phosphonobutane tricarboxylic acid-1,2,4, ethylenediamine tetra(methylene phosphonic acid), diethylenetriamine penta(methylene phosphonic acid), triethylenetetramine hexa(methylene phosphonic acid), aminopropylidene diphosphonic acid, hydroxypropylidene diphosphonic acid, hydroxybutylidene diphosphonic acid, hydroxyhexylidene diphosphonic acid, phosphonohydroxy acetic acid, polyisopropenyl phosphonic acid, nitrilo(trismethylene)(trishydroxyethylidene) diphosphonic acid and diethylenetriamine pentamethylene phosphonic acid.

3. The method of claim 1 wherein the chelating agent comprises hydroxyethylidene phosphonic acid.

4. The method of claim 1 wherein the chelating agent is hydroxyethylidene diphosphonic acid and the method further comprises adding sodium sulfite reducing agent.

5. A method for removing iron impurities from sand comprising adding to an aciueous slurry of the sand a chelating agent for iron cations for a time sufficient for the chelating agent to convert at least a portion of the iron impurities into water-soluble iron compounds, wherein the chelating agent comprises urea hydrochloride.

6. A method for removing iron impurities from sand comprising adding to an aqueous slurry of the sand a chelating agent for iron cations for a time sufficient for the chelating agent to convert at least a portion of the iron impurities into water-soluble iron compounds, further comprising adding to the aqueous slurry of the sand a reducing agent.

7. The method of claim 6 wherein the chelating agent comprises at least one member selected from the group consisting of polycarboxylic acids, organophosphonic acids and urea hydrochloride.

8. The method of claim 6 wherein the chelating agent comprises at least one member selected from the group consisting of ethylenediamine tetraacetic acid, citric acid, ethylenediamine disuccinic acid, organophosphonic acids and urea hydrochloride.

9. The method of claim 6 wherein the chelating agent comprises at least one member of the group consisting of ethylenediamine tetraacetic acid, citric acid and ethylenediamine disuccinic acid.

10. The method of claim 6 wherein the chelating agent comprises citric acid.

11. The method of claim 6 further comprising adding to the aqueous slurry of the sand a reducing agent selected from the group consisting of sodium sulfite, isoascorbic acid, alkali metal salts of isoascorbic acid, ascorbic acid, alkali metal salts of ascorbic acid, diethylhydroxylamine, glucose and hydrazme.

12. The method of claim 1 further comprising adding to the aqueous slurry of the sand a reducing agent selected from the group consisting of sodium sulfite and isoascorbic acid.

13. The method of claim 1 wherein the chelating agent is utilized at a level of from about 10 to about 100,000 parts per million (ppm) on a dry basis based on the weight of the dry sand.

14. The method of claim 1 wherein the chelating agent is utilized at a level of from about 10 to about 50,000 parts per million (ppm) on a drybasis based on the weight of the dry sand.

15. The method of claim 1 wherein the chelating agent is utilized at a level of from about 10 to about 1,000 parts per million (ppm) on a dry basis based on the weight of the dry sand.

16. The method of claim 1 wherein the chelating agent is citric acid and the reducing agent is isoascorbic acid.

17. The method of claim 6 wherein the reducing agent is added at a level of from about 5% to about 500% of the weight of the chelating agent on a dry basis.

18. The method of claim 6 wherein the reducing agent is added at a level of from about 10% to about 100% of the weight of the chelating agent on a dry basis.

19. The method of claim 6 wherein the reducing agent is added at a level of from about 10% to about 25% of the weight of the chelating agent on a dry basis.

* * * * *